United States Patent Office 3,212,650
Patented Oct. 19, 1965

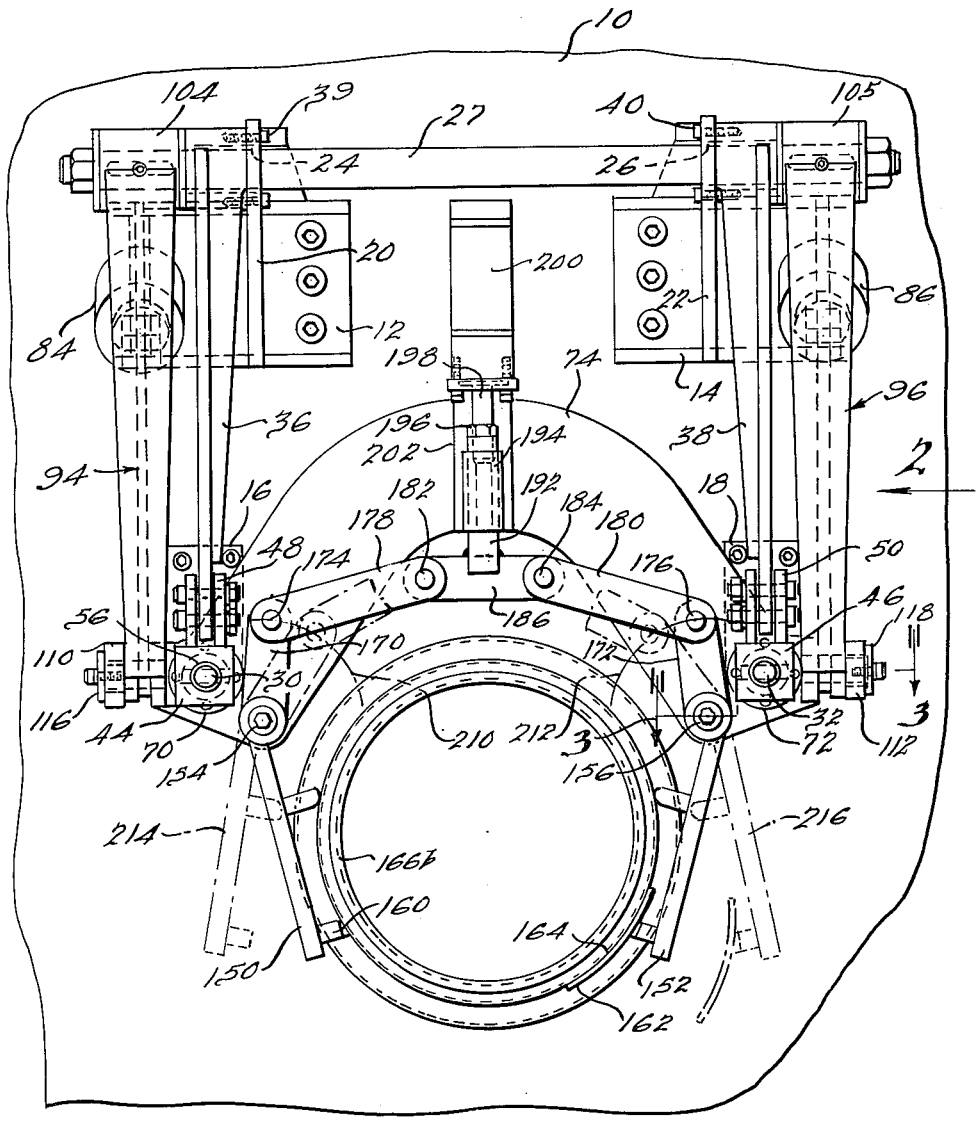

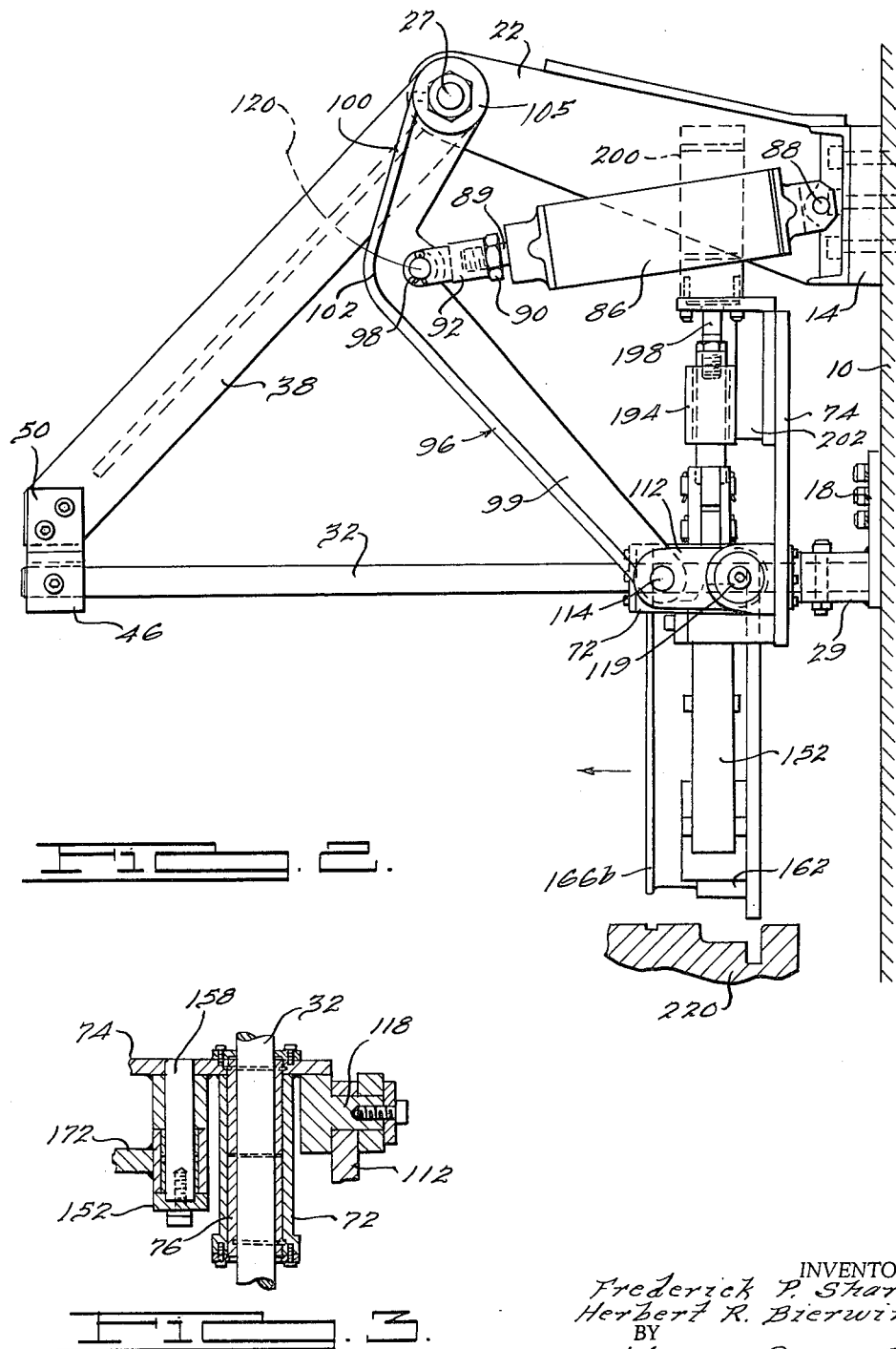

3,212,650
APPARATUS FOR UNLOADING ANNULAR
ARTICLES FROM A FORMING MACHINE
Frederick P. Sharpe and Herbert R. Bierwirth, both of Dearborn, Mich., assignors to Kelsey-Hayes Company of Delaware, Romulus, Mich.
Filed Apr. 13, 1962, Ser. No. 187,239
12 Claims. (Cl. 214—1)

This invention relates to article handling apparatus, and more particularly to workpiece transfer mechanism for association with a machine tool or the like.

An object of the present invention is to provide a workpiece transfer mechanism of simplified design which is readily adaptable for use with machine tool equipment.

Another object of the present invention is to provide a transfer mechanism for carrying a workpiece between stations which is capable of lifting the workpiece at the beginning of a work transfer cycle.

A further object of the present invention is provide a combination workpiece gripping device and workpiece transfer mechanism for moving a workpiece between stations.

Still a further object of the present invention is to provide an improved workpiece translation device which may be readily associated with the existing machinery with a minimum of time and expense.

Another object of the present invention is to provide a simplified work transfer mechanism utilizing a minimum number of motions and requiring a minimum number of movable parts subject to wear and malfunction.

The aforementioned objects are accomplished in the illustrative embodiment of the present invention by the provision of a transfer mechanism support frame which may be secured to the framework of a machine tool by bracket means. The frame supports guide rail means in a predetermined location relative to the machine and carriage means are slidably mounted on the rail means for reciprocable actuation between spaced positions. The carriage means is operable through a fluid actuator and a pair of link means pivotally mounted on the frame, the carriage means, and the fluid actuator. The carriage means supports jaw or gripping means which are independently actuable between an open released position and a closed gripping position. A linkage arrangement and a fluid actuator, carried with and by the carriage means, are provided to actuate the gripping means.

The illustrative embodiment is described in detail in the following specification wherein reference is made to the accompanying drawings in which:

FIGURE 1 is a side elevational view of apparatus embodying the principles of the present invention;

FIGURE 2 is an end view of the apparatus shown in FIG. 1 taken in the direction of the arrow 2;

FIGURE 3 is a sectional view taken along the line 3—3 in FIG. 1; and

Figure 4:
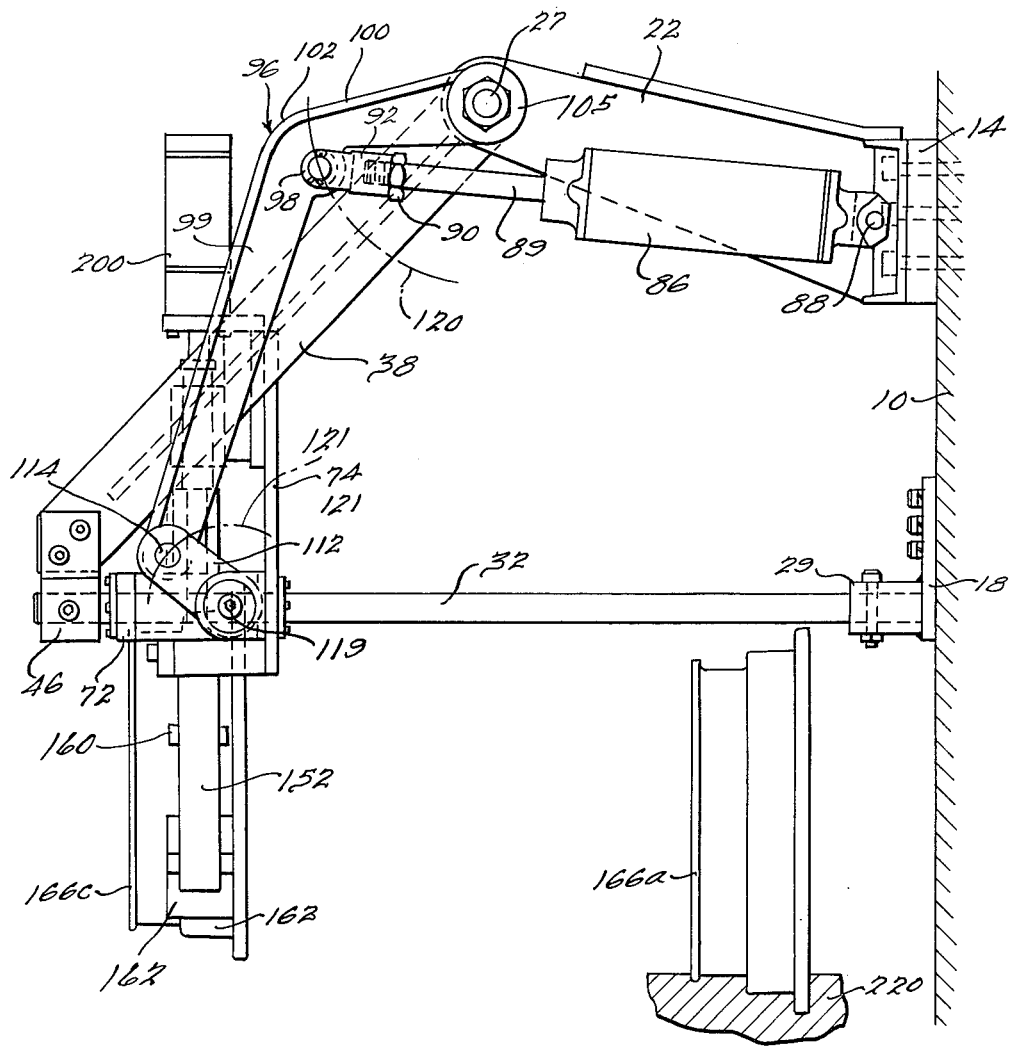
FIGURE 4 is another end view of the apparatus of FIG. 1 showing the apparatus in another operational position.

Referring now to the drawings, the transfer apparatus of the present invention is adapted for association with a frame 10 of a conventional machine tool such as a forming machine. Support brackets 12, 14, 16, 18 are provided for rigidly connecting the transfer apparatus to the machine in a predetermined position and are mounted by any conventional means such as bolts or welding. The brackets 12, 14 rigidly support spaced parallel arms 20, 22 which extend upwardly from the brackets and are provided with shaft support holes 24, 26 at the outermost ends thereof. A shaft 27 is mounted in the holes 24, 26 and rigidly supported by the arms 20, 22. The brackets 18, 20 are provided with outwardly extending housings 28, 29 in which spaced parallel guide shafts 30, 32 are fixedly secured by any suitable means. The outer extremities of the guide shafts 30, 32 are supported by diagonally extending support arms 36, 38 which are fixedly mounted at one end of the shaft 27 and connected to the arms 20, 22 by bolt means 39, 40. Bushing blocks 44, 46 are fixedly secured to the other ends of the support arms 36, 38 by clevis arrangements 48, 50. The bushing blocks 44, 46 are provided with central bores 56, 58 in which the outer ends of the guide shafts 30, 32 are received and secured by suitable fastening means.

Carriage means are associated with the guide rails 30, 32 for sliding reciprocable movement therealong and comprise support block means 70, 72 which are rigidly secured to the lower ends of an arcuate arched support plate 74 at one end thereof. As shown in FIG. 3, each of the support blocks are provided with bearing means 76, fixedly mounted therein and slidably received on the associated guide rail. The carriage assembly is reciprocable along the guide rails by actuator means such as air cylinders 84, 86. Each of the actuator means are pivoted, as shown in FIG. 2, at 88 to the frame and are pivotally connected through a piston rod 89, a jam nut 90 and a clevis member 92 to carriage actuating arms 94, 96 at 98. Each of the actuating arms comprises a long leg 99 and a short leg 100 which intersect at an acute angle to form a knee portion 102. The pivotal connection 98 is made at the knee portion 102 as shown in FIGS. 2 and 4. The upper ends of the short legs 100 are pivotally supported on the shaft 27 by means of transversely extending portions 104, 105 having central bearing bores. The lower ends of the long legs of each actuating arm are pivotally connected to drag links 110, 112, as indicated at 114 in FIGS. 2 and 4. The drag links are pivoted on stub shaft members 116, 118 as indicated at 119.

As seen in FIG. 4, actuation of the air cylinders and reciprocation of the piston rods thereof displaces the actuating arms 94, 96 in a pivotal path about the shaft 27. The pivots 98 at the knee joints travel in arcuate paths 120 and the pivots 114 at the lower ends of the actuating arms travel in arcuate paths 121. Consequently, the carriage assembly may be moved linearly along the guide shafts without binding and the pivot point 119 travels in a straight line.

Referring now to FIG. 1, workpiece gripping means are provided on the carriage device and are movable therewith along the support rails. The gripping means include a pair of pivotally mounted gripping arms 150, 152 which are pivoted at 154, and 156, respectively, to the arched support bracket 74 by pin means 158 shown in FIG. 3. The gripping arms are provided at their lower ends with workpiece engaging means in the form of contact buttons 160 on the arm 150 and an arcuate plate 162 on the arm 152. The plate 162 has an arcuate abutment surface 164 which is adapted to substantially correspond to the periphery of articles to be gripped. The subject apparatus is particularly adapted to grip annular bands 166, as shown in FIG. 1. The other ends 170, 172 of the gripping arms 150, 152 are inwardly inclined toward one another and are pivotally connected at 174, 176 to intermediate links 178, 180 which are pivotally connected at 182, 184 to a drive bar 186. The drive bar is fixedly mounted on the end of a connecting pin 192 which is slidably mounted in a guide sleeve 194 and connected at the upper end by means of a jam nut 196 or the like to a piston rod 198 of actuator means 200 in the form of an air cylinder. The cylinder 200 and guide sleeve 194 are mounted on a support bracket 202 which is fixedly secured on the upper portion of the arched support 74.

The air cylinder 200 is connected to a power source in a conventional manner by the means of air hoses or the like (not shown). The workpiece gripping mechanism is movable as a unit with the carriage means between the retracted and extended positions thereof. Actuation of the air cylinder 200 causes reciprocable movement of the drive bar 186 and linear displacement of the pivot points 182, 184 which results in arcuate displacement of the pivot points 174, 176 along arcs 210, 212. Corresponding arcuate movement of the links 170, 172 results in arcuate displacement of the contact buttons 160 and the contact plate 162 between a retracted position shown in phantom at 214, 216 and an extended position in gripping engagement with the workpiece. Thus actuation of the air cylinder causes gripping engagement of the contact members with the workpiece in one instance and releases the contact members from the workpiece in the other instance.

The subject workpiece transfer mechanism can be associated with machine tools in a variety of positions to provide for delivery of a workpiece to a forming station in the machine or for removal of a workpiece from a forming station at the machine, or for both. The sequence of operation is such that the same apparatus is adaptable for either or both of the desired functions. Furthermore, the apparatus can be mounted conveniently in any position above or below or on the side of the desired path of travel of the workpiece and can be connected to existing machinery by the simple adaptation of the bracket members 12, 14, 16, 18 to the existing machine structure. Assuming that the apparatus is designed to carry a workpiece from a position adjacent the machine after a forming operation to a delivery chute or the like, the carriage will be initially positioned in the position shown in FIG. 2 with the gripping means in the position shown in phantom in FIG. 1. When the associated machine has finished a forming operation on a workpiece 166a and while the workpiece is still retained in the machine on a roll forming die 220 or the like, the cylinder 200 may be actuated to move the gripping means from the retracted open position to the extended closed gripping position shown in FIG. 1. Actuation of the air cylinder 200 will cause downward displacement of the drive bar 186 and result in initial inward and downward arcuate movement of the workpiece contacting means 160, 162. The movement of the drive bar brings the workpiece contact means into gripping engagement with the side surfaces of the workpiece. The final stage of movement of the workpiece contact means is inward and upward. Thus in addition to obtaining a gripping engagement between the contact means and the workpiece, the workpiece will be lifted during the latter portion of the movement of the jaw mechanism from the position 166a of support by the machine to the position 166b clear of the machine. The lifting of the workpiece from the support position on the machine is essential to prevent entanglement and damage during the subsequent lateral movement of the workpiece.

When the workpiece has been gripped and lifted, the air cylinders 84, 86 are actuated to extend the associated piston rods and move the carriage mechanism along the guide rails 30, 32 from the position shown in FIG. 2 to the position shown in FIG. 4. The drive arms 94, 96 are moved in a pivotal path about the shaft 27 and cause arcuate displacement of the pivot points 98 along arcs 120. The arcuate displacement of the pivot points 98 is accommodated by the pivotal connections of the air cylinders to the frame. The drag links 110, 112 pull the carriage means along the guide rails to the fully extended position shown in FIG. 4 whereat the workpiece has a portion 166c. At such time, the air cylinder 200 may be again actuated to retract the drive bar and release the workpiece contact means from gripping engagement with the workpiece. The workpiece is thereby allowed to be placed on a conveyor chute or in another position at a workstation for a subsequent machining operation. After the workpiece has been released, actuation of the air cylinders 84, 86 will draw the actuating arms 94, 96 rearwardly and move the carriage to the original position whereat the apparatus is ready for another operational cycle.

It will be apparent to those skilled in the art of transferring workpieces from station to station that the subject apparatus is readily adaptable for use with a variety of machines and for a variety of purposes. Some modifications and rearrangement of the parts may be necessary to accommodate other uses, and it is intended that the scope of this invention include both modifications and rearrangements of the parts which embody the principles of the present invention.

The invention claimed is:

1. A transfer apparatus adapted for association with a conventional forming machine comprising pairs of upper and lower support bracket means for rigidly connecting the transfer apparatus to the machine in a predetermined position, a pair of spaced parallel arms extending outwardly from the upper support bracket means, shaft support means provided at the outermost ends of said arms, a shaft mounted on said shaft support means and extending transversely to said spaced parallel arms between the upper support bracket means, outwardly extending housing means fixed to the lower support bracket means, spaced outwardly extending parallel guide shaft means fixedly mounted in said housing means, support arm means supportingly connected to the ends of said guide shaft means and extending upwardly therefrom and being fixedly connected to said spaced parallel arms, carriage means slidably mounted on said guide shaft means, first reciprocable actuator means movable along a linear path causing reciprocable movement of said carriage along a predetermined linear path, pivotal mounting means connecting said actuator means at one end to said upper support bracket means, carriage actuating arms pivotally mounted at one end to said shaft, pivotal connecting means pivotally connecting the other end of said carriage actuating arms to said carriage means, a pivotal connection between the other end of said actuator means and said carriage actuating arms, workpiece gripping and elevating means movable between open and closed positions for simultaneously gripping and elevating a workpiece during movement between the oepn and closed positions and being mounted on the carriage means for movement therewith, and second reciprocable actuation means for said workpiece gripping and elevating means movable only along a linear path for simultaneously causing gripping engagement of said gripping and elevating means with a workpiece and lifting movement of the workpiece during movement between the open and closed positions.

2. The invention as defined in claim 1 and wherein said carriage means comprises support block means slidably mounted on said guide shaft means, and an arcuate arch shaped support extending between said support block means.

3. The invention is defined in claim 1 and wherein said first reciprocable actuator means comprises a pair of power cylinders, each of said power cylinders being pivotally secured to one of the upper support bracket means and extending outwardly in parallel planes adjacent said guide shaft means.

4. The invention as defined in claim 1 and wherein said carriage actuating arms each comprise a lower long leg and an upper short leg which intersect at an acuate angle to form a knee portion, and said pivotal connection being at the knee portion.

5. The invention as defined in claim 1 and wherein said pivotal connecting means comprises stub shaft members mounted on said carriage means, and drag link means pivotally mounted on one end to said stub shaft members and pivotally connected at the other end to said carriage actuating arms.

6. The invention as defined in claim 1 and wherein said workpiece gripping means comprises a pair of pivotally mounted gripping arms movable between open and closed positions, pivot means mounting said gripping arms on said carriage means intermediate the ends of said gripping arms, workpiece engaging means mounted on the lower ends of said gripping arms, the upper ends of said gripping arms being inwardly inclined toward one another, and intermediate link means pivotally connecting the upper ends of said gripping means to said actuation means.

7. The invention as defined in claim 1 and wherein said actuation means comprises a power cylinder fixedly mounted on said carriage means, and reciprocable drive bar means connected to said power cylinder at one end and pivotally connected to said workpiece gripping and elevating means at the other end.

8. The invention as defined in claim 6 and wherein said workpiece engaging means comprises spaced contact buttons on one of said gripping arms and an arcuate plate on the other of said gripping arms.

9. The invention as defined in claim 2 and wherein said workpiece gripping and elevating means comprises a pair of pivotally mounted gripping arms movable between open and closed positions, pivot means mounting said gripping arms on said arcuate arched shaped support adjacent the lower ends thereof intermediate the ends of said gripping arms, workpiece engaging means mounted on the lower ends of said gripping arms, the upper ends of said gripping arms being inwardly inclined toward one another, said actuation means comprising a power cylinder fixedly supported to the central upper portion of said arcuate arched shaped support, reciprocable drive bar means connected to said power cylinder, and intermediate link means pivotally connected between said drive bar means and the upper ends of said gripping arms.

10. A transfers apparatus for association with a conventional forming machine comprising support bracket means for rigidly connecting the transfer apparatus to the machine in a predetermined position, spaced parallel support means extenting outwardly from said bracket means, shaft means extending transversely between said support means, spaced parallel horizontally extending guide shaft means fixedly mounted on said bracket means, brace means connected at one end to said support means and supportingly connected at the other end to said guide shaft means, carriage means slidably mounted on said guide shaft means for only reciprocable horizontal movement therealong, first reciprocable actuator means movable along a linear path for causing reciprocable movement of said carriage means along a predetermined linear path, carriage actuating arm means pivotally mounted at one end to the transversely extending shaft means, pivotal connecting means pivotally connecting the other end of said carriage actuating arm means to said carriage means, an intermediate pivotal connection between the one end and the other end of said carriage actuating arm means and connecting said actuator means to said carriage actuating arm means, pivotally mounted workpiece gripping and elevating means movable between open and closed positions for simultaneously gripping and elevating a workpiece by only pivotal movement during movement between the open and closed positions and being fixedly pivotally mounted on the carriage means for only horizontal movement therewith relative to said bracket means, and second reciprocable actuating means mounted on said carriage means for actuating said workpiece gripping and elevating means and being movable only along a linear path for simultaneously causing gripping engagement of said gripping and elevating means with a workpiece and lifting movement of the workpiece during pivotal movement between the open and closed positions.

11. Apparatus for simultaneously gripping and elevating a workpiece by only pivotal movement in a vertical plane comprising frame means, vertically mounted power cylinder means fixedly secured to said frame means, vertically movable piston rod means reciprocably operable along a vertically extending central axis by said power cylinder means, substantially horizontally extending attachment means connected to said piston rod means and being vertically movable therewith, pivotally movable gripping and elevating link means mounted for only swinging movement in a vertical plane about a fixed pivot located intermediate the ends of said gripping and elevating link means, said fixed pivot being fixedly mounted on said frame means, workpiece contacting means mounted on the lower end of said gripping and elevating link means for movement in an arcuate path having a substantially horizontal portion for effecting engagement and disengagement with an annular workpiece during swinging movement and having a vertically extending portion for effecting elevation of the workpiece, movable pivot means located at the upper end of said gripping and elevating link means, and connecting link means pivotally connected at one end to the movable pivot means at the upper end of said gripping and elevating link means and being pivotally connected at the other end to said attachment means at a point spaced horizontally outwardly of the central axis of reciprocation of said piston rod means.

12. Apparatus for simultaneously gripping and elevating a workpiece by only pivotal movement in a vertical plane comprising carriage means movable only in a horizontal path, movable gripping and elevating link means pivotally mounted for swinging movement in a vertical plane, workpiece contacting means mounted on said movable gripping and elevating link means at the lower end, a movable pivot provided at the upper end of said movable gripping and elevating link means, an intermediate fixed pivot connecting said movable gripping and elevating link means to said carriage means, said workpiece contacting means being movable in an arc between a point spaced substantially vertically below said fixed pivot and a point spaced upwardly and inwardly toward said carriage means, vertically mounted cylinder means fixedly mounted on said carriage means, vertically movable piston rod means reciprocably operable by said power cylinder means upwardly and downwardly along a vertically extending central axis, attachment means connected to said piston rod means and being vertically movable therewith, and connecting link means pivotally connected at one end to said horizontally extending attachment means and being pivotally connected at the other end to said movable gripping and elevating link means at said movable pivot to effect movement of said workpiece contacting means along said arc.

References Cited by the Examiner

UNITED STATES PATENTS

| 1,870,506 | 8/32 | Hardman. | |
|---|---|---|---|
| 1,977,307 | 8/34 | Hayssen. | |
| 2,252,534 | 8/41 | Trotter | 214—332 |
| 2,904,202 | 9/59 | Brady | 214—653 |
| 3,061,115 | 10/62 | Sharpe. | |

FOREIGN PATENTS 787,402   12/57   Great Britain.

HUGO O. SCHULZ, *Primary Examiner.*

MORRIS TEMIN, MARVIN A. CHAMPION,
*Examiners.*